United States Patent [19]

Willy et al.

[11] Patent Number: 5,048,888
[45] Date of Patent: Sep. 17, 1991

[54] SUBASSEMBLY FOR THE FRONT AND REAR REGION OF A MOTOR VEHICLE

[75] Inventors: Gerd Willy, Weil; Hubert Hutai, Grafenau; Norbert Schwuchow; Gerhard Burk, both of Sindelfingen, all of Fed. Rep. of Germany

[73] Assignee: Mercedes-Benz AG, Fed. Rep. of Germany

[21] Appl. No.: 561,604

[22] Filed: Aug. 2, 1990

[30] Foreign Application Priority Data

Aug. 5, 1989 [DE] Fed. Rep. of Germany ....... 3925990

[51] Int. Cl.$^5$ .............................................. B60R 27/00
[52] U.S. Cl. .................................... 296/189; 296/194; 296/195; 296/204
[58] Field of Search .............. 296/189, 188, 194, 195, 296/204; 280/784

[56] References Cited

U.S. PATENT DOCUMENTS

| 3,614,124 | 10/1971 | Schwakenlender . | |
|---|---|---|---|
| 3,746,387 | 7/1973 | Schwenk | 296/204 |
| 3,791,472 | 2/1974 | Tatsumi | 296/204 X |
| 3,806,184 | 4/1974 | Dean | 296/189 X |

FOREIGN PATENT DOCUMENTS

| 1074416 | 1/1960 | Fed. Rep. of Germany ...... 296/204 |
| 3146554 | 7/1982 | Fed. Rep. of Germany . |
| 3522447 | 7/1986 | Fed. Rep. of Germany . |
| 250096 | 9/1987 | Fed. Rep. of Germany . |
| 2440304 | 5/1980 | France . |
| 592682 | 5/1959 | Italy ..................................... 296/188 |
| 1405033 | 7/1925 | United Kingdom ................ 296/204 |
| 1183920 | 3/1970 | United Kingdom . |
| 1400568 | 7/1975 | United Kingdom . |

Primary Examiner—Margaret A. Focarino
Assistant Examiner—Gary C. Hoge
Attorney, Agent, or Firm—Evenson, Wands, Edwards, Lenahan & McKeown

[57] ABSTRACT

A subassembly for the front and rear region of a motor vehicle, which comprises two longitudinal members to which a subframe designed as assembly carrier is attached by one end region of two elongate carrier parts. The members are together used for energy absorption in the case of a vehicle impact and are fixed by their ends, which project as far as a passenger compartment, with laterally spaced longitudinal members reinforcing the latter at the vehicle floor. After they have been fixed on the longitudinal members, the carrier parts extend freely with a portion oriented approximately in the longitudinal direction of the vehicle towards the passenger compartment and are guided with an obtuse-angled bend about a vertical axis towards the respective proximate longitudinal member and attached to the latter. Near to the bend, these carrier parts are connected in the longitudinally oriented portion by a subframe cross member.

13 Claims, 1 Drawing Sheet

SUBASSEMBLY FOR THE FRONT AND REAR REGION OF A MOTOR VEHICLE

BACKGROUND AND SUMMARY OF THE INVENTION

The invention relates to a subassembly for the front and rear region of a motor vehicle, which comprises two longitudinal members to which a subframe designed as assembly carrier is attached by one end region of two elongate carrier parts, which members are together used for energy absorption in the case of a vehicle impact and which are fixed by their ends, which project as far as a passenger compartment, with lateral longitudinal members reinforcing the latter at the vehicle floor.

A subassembly of this kind, which is deformable in the case of a vehicle impact and thereby reduces the deforming action of an impact energy on the passenger compartment, has been disclosed for a front region of a vehicle in German Patent Document DE-OS 3,146,554. In this arrangement, a subframe is attached at the front and additionally in the vicinity of the passenger compartment, to longitudinal members, and by the latter to a vehicle floor having lateral door sills. It is thereby intended to ensure that the subframe is used to absorb force in the case of a frontal impact in that stop surfaces on the subframe can be brought up against a passenger-compartment front wall connected to the longitudinal members.

In German Patent Document DE-OS 3, 522, 447, a vehicle is equipped with a subframe which has two longitudinal members and one cross member and, together with a laterally spaced one of the longitudinal members of the body situated on both sides forms a rigid unit which is intended to transmit the impact forces on the subframe into the laterally spaced longitudinal members of the vehicle superstructure proper.

The particular disadvantage of the embodiments of both printed publications is that the forward structure of the vehicle is intrinsically of very stable design, with the result that, in the case of an accident, the impact energy is reduced only slightly by deformation of the carrier parts of the forward structure, or the energy remaining after their deformation is transmitted directly into the passenger-compartment front wall, with the result that it is possible to protect the passenger compartment from deformations only inadequately. An already know deformation of the longitudinal members, possible over a long distance, is prevented by the subframe.

An object on which the invention is based is to design a subassembly of the above noted type in such a way that the subframe permits the deformation of a longitudinal member and reduces the transmission of the impact energy into a passenger compartment.

This object is achieved by providing arrangements wherein the carrier parts extend freely after they have been fixed on the longitudinal members respectively with a portion oriented approximately in the longitudinal direction of the vehicle towards the passenger compartment and are guided with an obtuse-angled bend about a vertical axis towards the respectively proximate lateral spaced longitudinal members of the vehicle super structure proper and are attached to the latter.

By connecting a subframe to the two longitudinal members of the body in such a way and, by the other ends, to laterally spaced longitudinal members at the vehicle floor and by the special shape of the subframe carrier parts, the deformation of the longitudinal members of the body can take place over a long distance in the case of an accident without hindrance by the subframe. Due to its controlled deformation in the region of the bend, the subframe likewise reduces impact energy. During this process, it remains fixed to the body at its points of attachment and thus does not have to unlatch in an accident to enable a deformation in the region of the longitudinal members to take place.

The subframe cross member, which does not hinder the further bending of the subframe carrier parts oriented approximately in the longitudinal direction of the vehicle, has a stabilizing effect for the guidance of the subframe towards the passenger compartment and prevents the subframe carrier parts from bending out.

It is, furthermore, advantageous to deflect the subframe downwards along a slope during its displacement, i.e. to deflect it under the passenger compartment, so that a passenger-compartment front wall is not damaged or deformed by the displaced subframe.

Furthermore, the bent portion of the subframe carrier parts comes to lie in front of the vehicle wheels, which may likewise be moved towards the passenger compartment, and thereby prevents them from penetrating.

In order to avoid transmission of the assembly vibrations to the vehicle body via the subframe to the greatest possible extent, the carrier parts of the subframe are mounted resiliently on the vehicle floor via rubber elements.

Other objects, advantages and novel features of the present invention will become apparent from the following detailed description of the invention when considered in conjunction with the accompanying drawings.

DETAILED DESCRIPTION OF THE DRAWING

Figure 1:
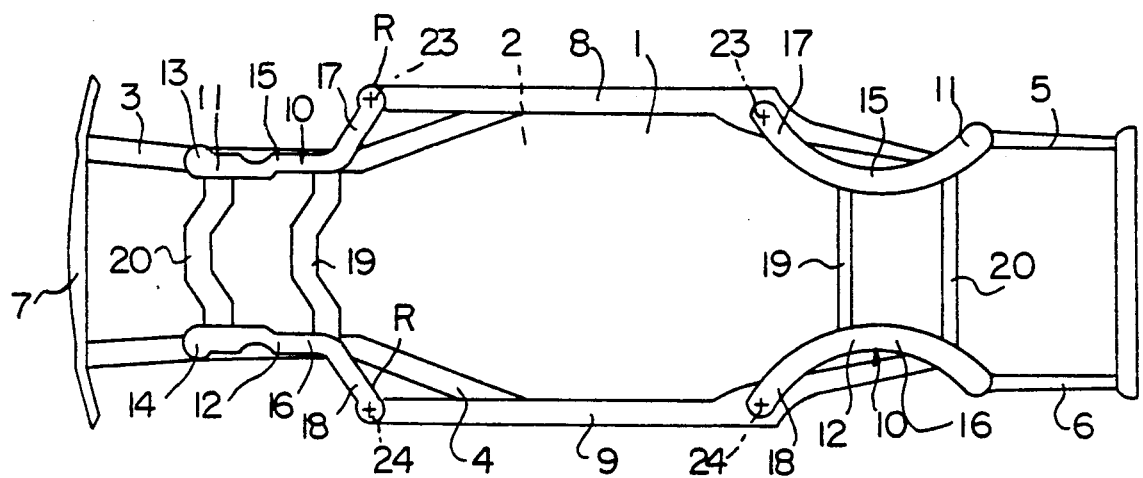
FIG. 1 shows, in bottom view, a vehicle frame having front and rear and laterally spaced longitudinal members and a front and a rear subframe, constructed according to a preferred embodiment of the invention.

FIG. 1 shows an underbody of a vehicle body, which comprises a vehicle body floor 1 for a passenger compartment 2 situated above it and, in front of said compartment, at the front, two longitudinal members 3 and 4 and, in the rear region, likewise two longitudinal member 5 and 6 of the body.

A bumper 7 is situated in the front region of the vehicle transversely in front of the longitudinal members 3, 4, and the longitudinal members 3, 4 project in the longitudinal direction of the vehicle towards the passenger compartment 2 and are fixed thereunder on in each case one lateral longitudinal member 8 and 9, respectively, bounding the passenger compartment 2 at the vehicle floor 1 on both sides. Attached to the two longitudinal members 3 and 4 is a subframe 10 which supports various assemblies (not shown) in the front region of the vehicle. The subframe 10 has two elongate carrier parts 11 and 12, which are fixed by their forward end regions 13 and 14 respectively on the longitudinal members 3 and 4, then extend freely towards the passenger compartment 2, one portion 15 and 16 respectively being oriented in the longitudinal direction of the vehicle, and, after an obtuse-angled bend 17 and 18 respectively about a vertical axis of the vehicle, are guided towards the in each case proximate laterally spaced longitudinal members 8 and 9 respectively and are attached to the latter.

Figure 2:
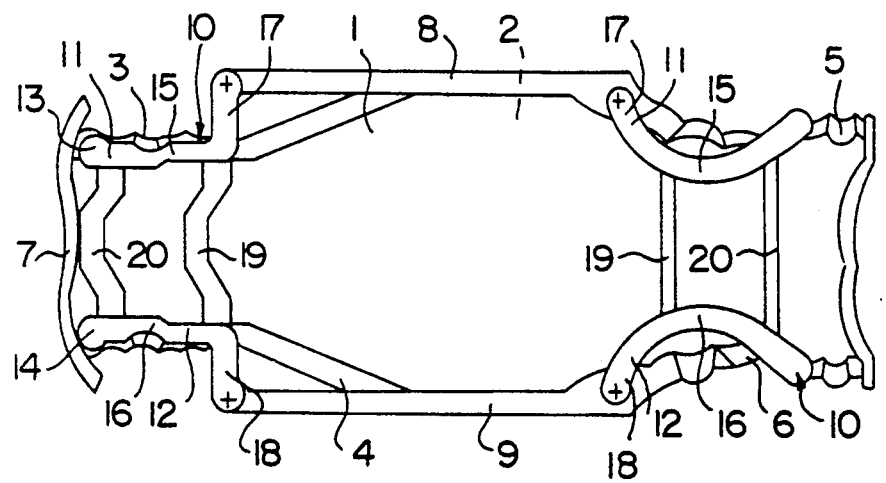
FIG. 2 shows the same vehicle frame after a front and rear impact.

As is shown in FIG. 2, the obtuse-angled bends 17, 18 of the carrier parts 11, 12 lead to the subframe 10 being displaced along with the longitudinal members 3, 4 towards the passenger compartment 2 in the case of a frontal impact and a corresponding deformation of said longitudinal member, its carrier parts 11, 12 bending even further in their bend 17 and 18 respectively and the deformation of the longitudinal members 3, 4 being unhindered by the subframe 10 over a wide area. In order to improve the stability of the subframe 10 during the displacement movement, the two carrier parts 11 and 12 are connected by a subframe cross member 19 near to their bend 17 and 18 respectively in the longitudinally oriented portion 15, 16 and, moreover near to the frontal and regions 13, 14 of the carrier parts 11, 12, a cross member 20 connecting the latter serves to stabilize the subframe 10 and make possible securing of the assemblies.

Figure 3:
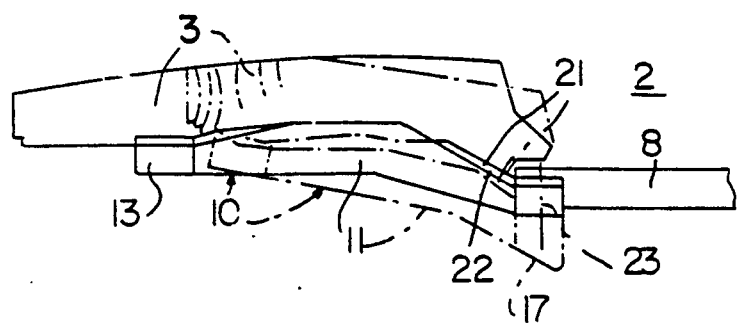
FIG. 3 shows, in side view, a left-hand front longitudinal member with a subframe carrier part before and, in chain lines, after an impact.

To ensure that the subframe 10 is not forced into the passenger compartment 2 when it is displaced, it has, as can be seen more clearly in side view in FIG. 3, a slope 21 pointing towards the vehicle floor 1 on the carrier parts 11 and 12, by means of which it is deflected downwards along a parallel slope 22 on the vehicle floor 1 in the case of displacement towards the passenger compartment 2. For a smooth displacement movement, a slope 21 or 22 respectively, having an angle of approximately 30° to the longitudinal axis of the vehicle, has proven advantageous. Since the subframe 10 should not become detached from its fastenings on the lateral longitudinal members 8, 9, it is fixed there via swivel bearings 23, 24, which do not hinder swivelling of the carrier part 11 or 12 about a vertical axis during its increased bending.

The side view thus shows for a subassembly in the front region how, during the deformation of the longitudinal member 3 by an impact, drawn in chain lines, the carrier part 11 of the subframe 10, which carrier part is fixed with a forward end region 13 on the longitudinal member 3, is pushed with the said longitudinal member 3 towards the passenger compartment 2 (not shown in greater detail) and with a slope 21 glances downwards off a slope 22 on the vehicle floor 1 or on the longitudinal member 3. During this process, the bend 17 of the carrier part 11 is increased, impact energy thereby being reduced; however, the subframe 10 does not become detached from the vehicle floor 1.

A subframe 10 designed and fixed in a similar manner is also provided in the rear region of the vehicle and, in the case of a rear impact, can be displaced towards the passenger compartment 2, its carrier parts 11, 12 being bent further towards the center of the vehicle, while the longitudinal members 5, 6 of the body are unhindered in their deformation over a long distance. Further components of the arrangement in the rear region are provided by analogy with the same numerals as in the front region and their manner of functioning can also be taken from the description of the front region.

In order to avoid transmission of the assembly vibrations to the vehicle body via the subframe to the greatest possible extent, the carrier parts of the subframe are mounted resiliently on the vehicle floor via resilient elements R.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Motor vehicle body arrangement comprising:
   a first pair of laterally spaced longitudinally extending bearer members extending adjacent a vehicle passenger compartment,
   a second pair of laterally spaced longitudinally extending bearer members connected to respective ones of said first pair of bearer members an extending beyond the first pair of bearer members into a vehicle end region adjacent the passenger compartment,
   and an end region subframe disposed in the vehicle end region, said subframe including:
   a pair of carrier parts which each have an end attached to a respective bearer member of said second pair and an opposite end attached to a respective bearer member of said first pair, each of said carrier parts having a first portion extending longitudinally from its attachment at the bearer member of said second pair toward the passenger compartment and a second portion having an obtuse-angled bend about a vertical axis and extending from the first portion laterally to their respective attachment at the respective bearer member of said first pair,
   and a subframe cross member connecting the carrier parts adjacent the first and second portions thereof,
   whereby the subframe permits guided deformation of the longitudinal bearer members over a long distance and contributes to absorption of collision deformation energy by controlled deformation of the subframe in the region of the obtuse-angled bends.

2. An arrangement according to claim 1, wherein the subframe has a slope which points toward a vehicle floor under the passenger compartment and by means of which slope it glances off downwards along a parallel slope on the vehicle floor in the case of a displacement towards the passenger compartment.

3. An arrangement according to claim 2, wherein the slopes are designed with an angle of approximately 30° to the longitudinal axis of the vehicle.

4. An arrangement according to claim 1, wherein the carrier parts of the subframe are fixed on the respective lateral longitudinal members of the first pair via swivel bearings.

5. An arrangement according to claim 2, wherein the carrier parts of the subframe are fixed on the respective lateral longitudinal members of the first pair via swivel bearings.

6. An arrangement according to claim 3, wherein the carrier parts of the subframe are fixed on the respective lateral longitudinal members of the first pair via swivel bearings.

7. An arrangement according to claim 1, wherein the carrier parts of the subframe are mounted resiliently on a vehicle floor under the passenger compartment.

8. An arrangement according to claim 2, wherein the carrier parts of the subframe are mounted resiliently on a vehicle floor under the passenger compartment.

9. An arrangement according to claim 3, wherein the carrier parts of the subframe are mounted resiliently on a vehicle floor under the passenger compartment.

10. An arrangement according to claim 4, wherein the carrier parts of the subframe are mounted resiliently on a vehicle floor under the passenger compartment.

11. An arrangement according to claim 1, wherein said end region is a front end region of a motor vehicle.

12. An arrangement according to claim 1, wherein said end region is a rear end region of a motor vehicle.

13. An arrangement according to claim 1, comprising:
   a third pair of laterally spaced longitudinally extending bearer members connected to respective ones of said first pair of bearer members and extending beyond said first pair of bearer members into a vehicle end region adjacent the passenger compartment which is opposite the first mentioned vehicle end region, and
   a second end region subframe disposed in the second mentioned vehicle end region, said second subframe including:
   a further pair of carrier parts which each are attached at one end to a respective bearer member of said third pair and at an opposite end to a respective bearer member of said first pair, each of said further carrier parts having a first portion extending longitudinally from its attachment at the bearer member of said third pair toward the passenger compartment and a second portion having an obtuse-angled bend about a vertical axis and extending from the first portion laterally to its respective attachment at the respective bearer member of said first pair,
   and a further subframe cross member connecting the further carrier parts adjacent the first and second portions thereof.

* * * * *